(12) United States Patent
Fink et al.

(10) Patent No.: US 6,321,826 B1
(45) Date of Patent: Nov. 27, 2001

(54) MOLD CLOSING UNIT ESPECIALLY FOR A HOT CHAMBER DIE-CASTING MACHINE

(75) Inventors: Roland Fink, Winterbach; Norbert Erhard, Lorch; Herbert Noschilla, Schorndorf, all of (DE); Bruno Stillhard, St. Gallen (CH)

(73) Assignee: Oskar Frech GmbH + Co., Schorndorf (DE)

( * ) Notice: Subject to any disclaimer, the term of this patent is extended or adjusted under 35 U.S.C. 154(b) by 0 days.

(21) Appl. No.: 09/550,273

(22) Filed: Apr. 13, 2000

(30) Foreign Application Priority Data

Apr. 13, 1999 (EP) .................................................. 99106243

(51) Int. Cl.$^7$ .................................................. B22D 17/26
(52) U.S. Cl. .................... 164/316; 164/303; 164/309; 164/343; 425/190; 425/593
(58) Field of Search .................... 164/303, 309, 164/316, 343; 425/190, 589, 593

(56) References Cited

U.S. PATENT DOCUMENTS

| | | | |
|---|---|---|---|
| 2,684,510 | * 7/1954 | Muller | 164/318 |
| 4,566,522 | 1/1986 | Fink et al. | 164/316 |
| 5,052,908 | 10/1991 | Inaba et al. | 425/150 |
| 6,190,154 | * 2/2001 | Hehl | 425/190 |

FOREIGN PATENT DOCUMENTS

| | | |
|---|---|---|
| 30 18 288 A1 | 5/1982 | (DE) . |
| 0 383 935 A1 | 8/1990 | (EP) . |

\* cited by examiner

*Primary Examiner*—James P. Mackey
(74) *Attorney, Agent, or Firm*—Crowell & Moring, LLP

(57) ABSTRACT

A vertical adjustment device for a mold closing unit of a hot chamber die-casting machine is provided with a shear mechanism. An electrical servomotor is provided as a drive assembly for spreading the shear mechanism apart, with the axis of the servomotor being parallel to the guide surface for the shear mechanism and driving, through an angle transmission, a spindle oriented at less than 90° with respect to the drive axis of the servomotor. One end of each of the two lever pairs of the shear mechanism is connected pivotably with the closing unit or with the machine frame. The other ends are supported on the guide surface and the machine frame and on a guide surface of the closing unit.

5 Claims, 3 Drawing Sheets

MOLD CLOSING UNIT ESPECIALLY FOR A HOT CHAMBER DIE-CASTING MACHINE

This application claims the priority of European application 991 06 243.1, filed Apr. 13, 1999, the disclosure of which is expressly incorporated by reference herein.

BACKGROUND AND SUMMARY OF THE INVENTION

The present invention relates to a mold closing unit especially for a hot chamber die-casting machine having a machine stand and a guide surface located thereon for the closing unit operable by a crosshead. A vertical adjustment device in the form of a shear mechanism supports the closing unit, is located below the latter, and rests on the guide surface. The shear mechanism is capable of being spread apart by a drive assembly.

A mold closing unit of this type is known from DE 30 18 288 C2. Such a design has the advantage that the vertical adjustment device for the mold closing unit can be made very simple. Several lifting cylinders that must be controlled simultaneously and in the same direction are superfluous.

In the known design, a hydraulic piston is provided as the drive assembly for spreading the shear mechanism apart. The piston is guided in a pressure cylinder located directly in the crosshead. This design, which has an advantage in that no extra space is required in the machine stand for containing a pressure cylinder, makes it necessary to design and operate the crosshead in a special fashion.

It is an object of the present invention to provide a simple design for a mold closing unit of the type mentioned above.

To achieve this object, provision is made, in a mold closing unit of the type mentioned above, for a drive assembly formed by an electric servomotor located below the guide surface and aligned with its axis perpendicular to a drive direction. The servomotor operates a spindle drive engaging the shear mechanism through an angle transmission.

As a result of this design, a pressure cylinder arrangement in the crosshead is unnecessary. The space requirement for providing the servomotor below the guide surface is small because the servomotor has a length which is essentially parallel to the guide surface. It has been found that, when corresponding transmission ratios are used in this manner, relatively high supporting forces for the closing unit can be readily applied by electric motors, and a much finer tuning of the lifting speeds can be achieved in this manner without the construction cost becoming too great.

According to one feature of the invention, the servomotor can be designed as a geared brake motor so that, even if the power fails, there is no danger that the closing unit will fall back from its position once its position is set.

It is advantageous to have the axis of the servomotor aligned parallel with guide rods of the closing unit because then the space requirement for locating the motor can be minimized. According to a particularly advantageous feature of the invention, one end of one lever of the shear mechanism can be mounted pivotably on a housing part of the angular transmission, firmly mounted in the machine stand, while one end of another lever of the shear mechanism, not mounted on the angular transmission, can be located pivotably in a pressure element in the closing unit.

An embodiment of the invention is shown in the drawings and will be described below.

DETAILED DESCRIPTION OF THE DRAWINGS

Figure 1:
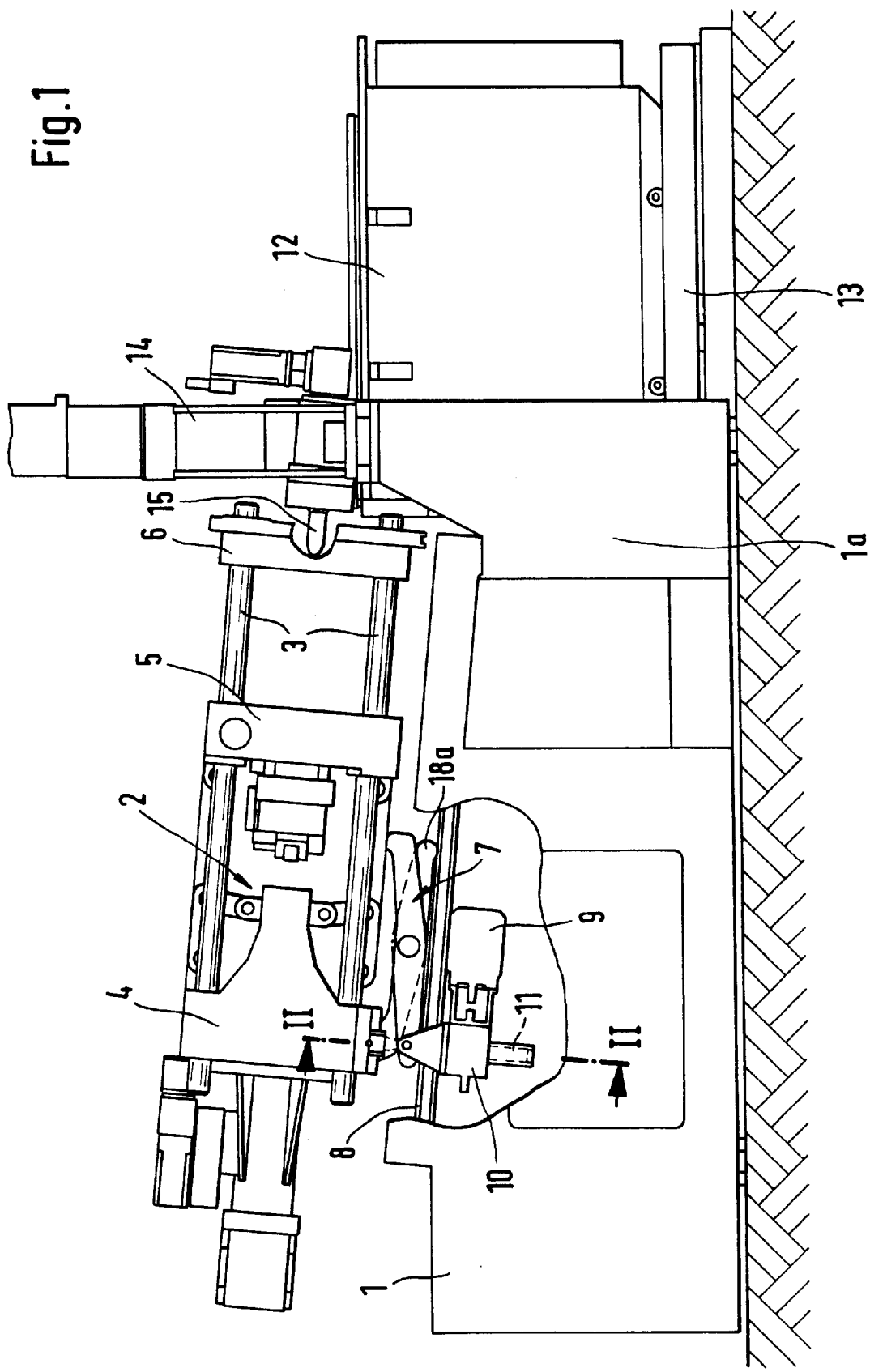
FIG. 1 is a schematic partially broken-away side view of a hot-chamber die-casting machine with a height-adjustable mold-closing unit according to the invention.

FIG. 1 shows that a mold-closing unit 2 is mounted on a machine stand 1. The mold-closing unit is made with all of the guide rods 3 inclined slightly to the horizontal, on which rods a mold-clamping plate 5 movable by closing unit 2 and a fixed mold-clamping plate 6 are located. Closing unit 2 is actuated by a crosshead or crossarm 4 supported, along with closing unit 2 and guide rods 3, through a shear mechanism 7 on a guide surface 8 of machine stand 1, which can be spread apart in a manner shown more clearly in FIGS. 2 and 4 by an electric servomotor 9 and an angle drive or angular transmission 10 with a threaded spindle 11 guided therein. The drive axis of the servomotor 9 runs essentially parallel to the guide rods 3 and to the guide surface 8. The axis of the spindle 11 runs approximately perpendicularly to the drive axis of the servomotor 9.

The machine stand 1 is abutted, in a manner known of itself, by an additional part 1a of the machine frame.

The crosshead or crossarm 14 is located in the additional part for holding and actuating the pouring piston which, in a manner not shown in greater detail because it is known, engages the casting cylinder located inside the melt. In the machine frame 1a, a melting furnace 12 is also provided on a guide 13. The form is filled through a mouthpiece 15 to which the solid mold clamping plate 6 for the casting process is brought in a sealing fashion.

Figure 2:
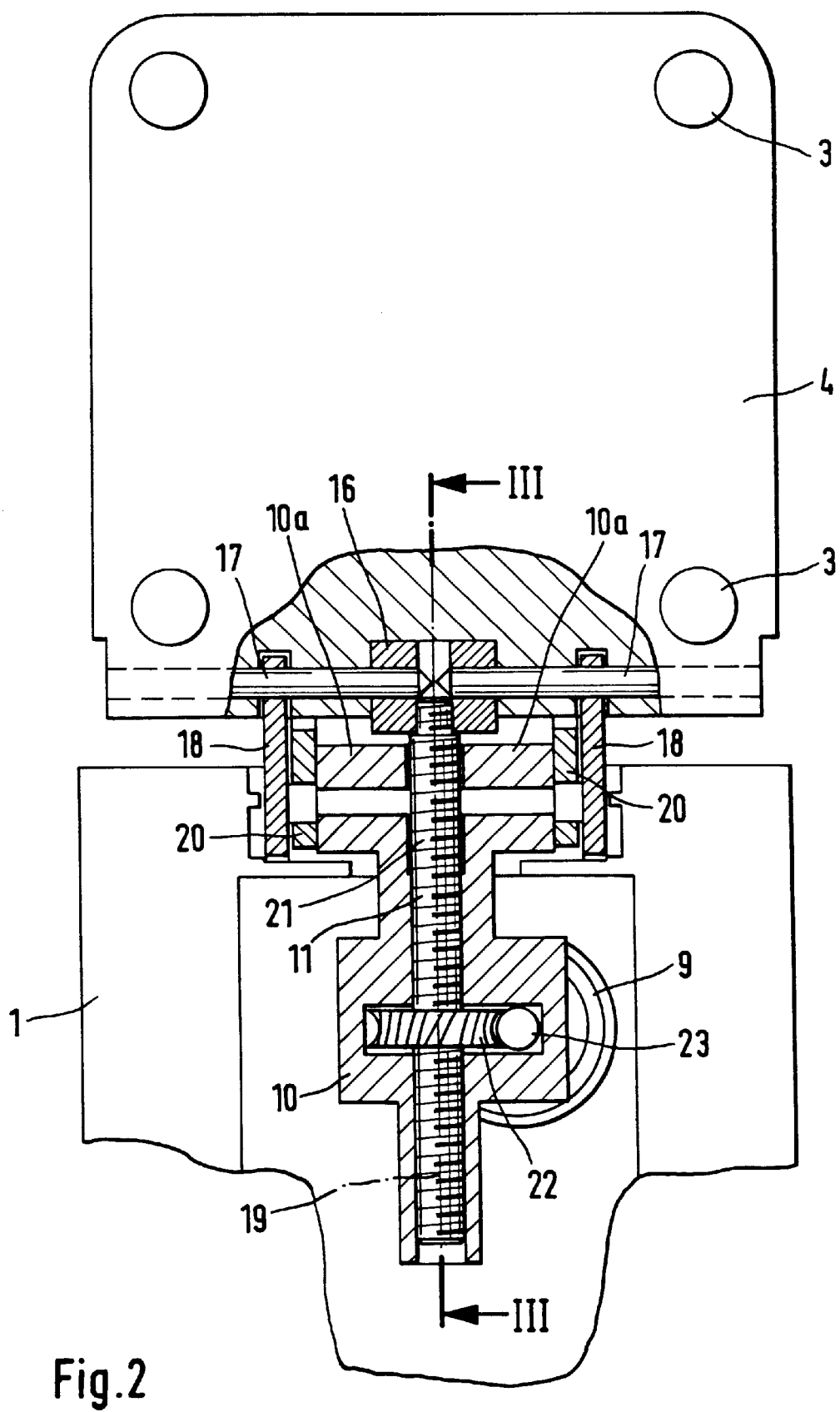
FIG. 2 is an enlarged view of the mold-closing unit in FIG. 1 along section line II—II.
Figure 3:
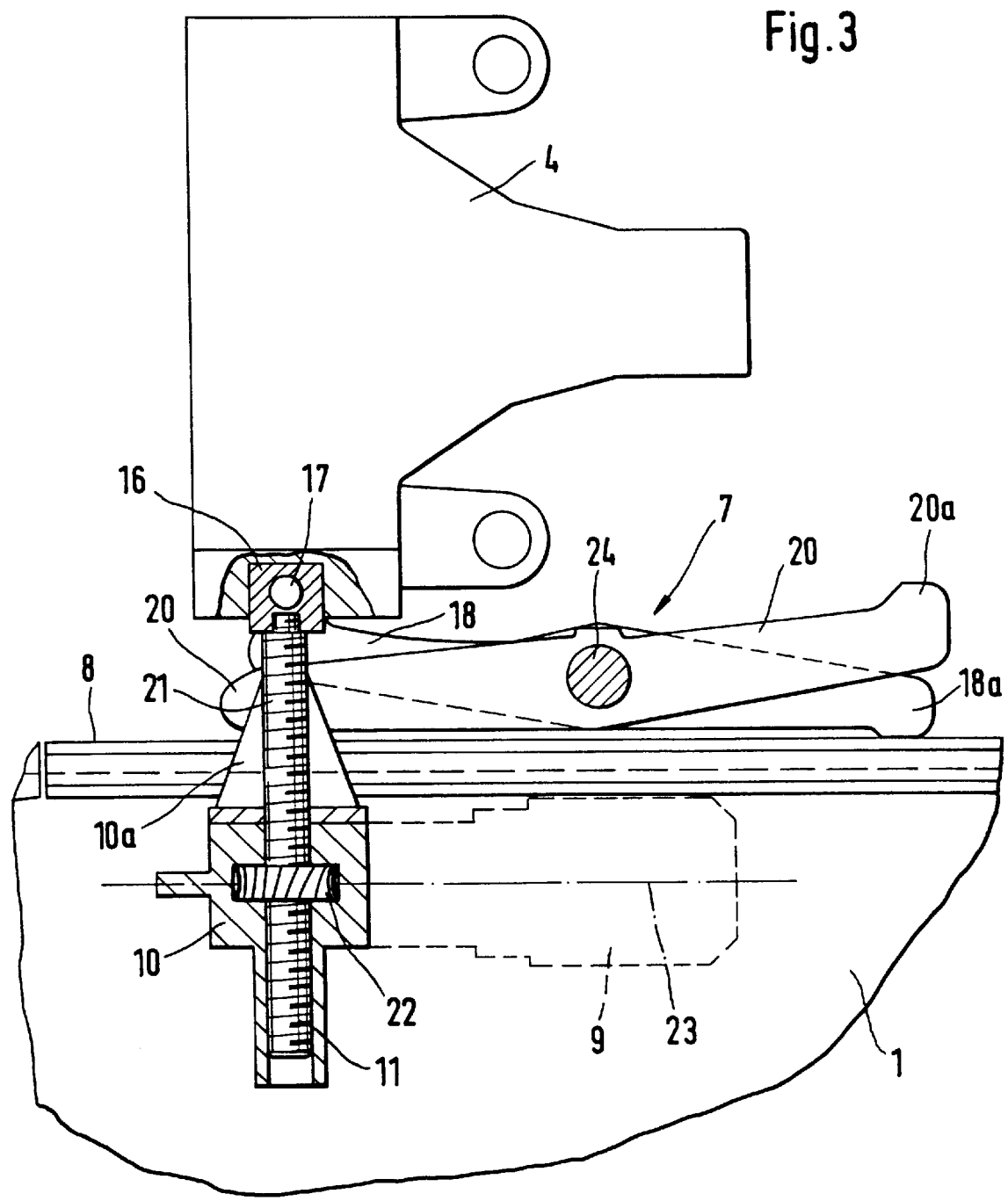
FIG. 3 is a schematic view of a section through the device in FIG. 2 along section line III—III.

FIGS. 2 and 3 show a pressure element 16 as located in the crosshead 4 that receives the upper free end of a threaded spindle 11. This pressure element 16 also serves to receive the inner ends of piston bolts 17 with axes which are perpendicular to the axis 19 of spindle 11. The free ends of the two outer levers 18 of the shear mechanism 7 that face spindle 11 are mounted on the pins 17, while the other ends 18a rest on guide surface 8, as is shown by FIGS. 1 and 3.

The ends of inner levers 20 that face the spindle 11 of the shear mechanism 7 are mounted on pins 21 which are firmly held sleevewise by the outwardly expanding housing part 10a of the angular transmission 10. The angular transmission itself and hence housing parts 10a rest on frame 1.

Spindle 11 is in mesh with a worm wheel 22 rotatably mounted inside the housing of the angular transmission 10. The wheel, in turn, is caused to rotate by a corresponding spindle 23 that cooperates with its circumference which is the drive axis of the electrical servomotor 9. Therefore, if the servomotor 9 is correspondingly impacted, then the worm wheel 22 will be caused to rotate by the spindle 23 and the spindle 11 will move upward out of the starting position shown in FIGS. 1, 2, and 3. The spindle pushes pressure element 16 with pin 17 upward while the corresponding ends of the inner lever 20 are retained at the pins 21 that remain fixed. The shear mechanism 7, therefore, is spread around its central axis 24 so that both the lever ends in the vicinity of spindle 11 and the ends 18a and 20a of the levers are moved apart from one another. The ends 20a support (FIG. 1) a wider area of a closing part or unit 2 so that the entire closing unit 2 can be raised in order to move the casting location of the mold (not shown) determined by the mouthpiece 15 further upward if necessary.

As can be readily seen from FIG. 1, the additional space requirement for locating the electric drive is extremely small because the axis of the servomotor 9, and therefore of the drive spindle 23 as well, is aligned approximately parallel to the axes of the guide rods 3 for the mold damping plates and the guide surface 8. It is only in the middle between lever pairs 18 and 20 within the guide surface that there is a certain amount of space for locating the servomotor 9 and the angular transmission 10.

The servomotor 9 is advantageously designed as a geared brake motor. By this measure, it can be prevented that, when the power fails, the shear mechanism does not retain the position set. The spindles 11 and 23 and the corresponding worm wheel 22 can be provided, in a known fashion, with self-locking pitches as well. A very precise vertical adjustment is possible by way of the electric drive which, without considerable additional expense, also makes it possible, following a relatively rapid vertical adjustment, to achieve a very precise and slow adaptation to the casting position by corresponding rotational speed reduction.

In the manner described, the mold closing unit of a hot chamber die-casting machine can be precisely adjusted vertically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Mold closing unit especially for a hot chamber diecasting machine comprising:

a machine stand and a guide surface associated therewith for a closing unit operable by a crosshead, a vertical adjustment device formed by a shear mechanism that supports the closing unit, is located below the closing unit, and rests on the guide surface, and a drive assembly by which said shear mechanism is made capable of being spread apart, wherein said drive assembly includes a servomotor that is electric, that is located below the guide surface, and that has its axis aligned perpendicular to a drive direction, and wherein said drive assembly operates a spindle drive engaging said shear mechanism through an angular transmission.

2. Mold closing unit according to claim 1 wherein said servomotor is a geared brake motor.

3. Mold closing unit according to claim 1 wherein said closing unit includes guide rods and wherein the axis of said servomotor is aligned parallel to said guide rods of said closing unit.

4. Mold closing unit according to claim 1 wherein said shear mechanism includes a first lever, and wherein one end of said lever of said shear mechanism is mounted pivotably on a housing part of the angular transmission resting freely on said machine stand.

5. Mold closing unit according to claim 4 wherein said shear mechanism includes a second lever, and wherein one end of the second lever of the shear mechanism that is not mounted on said angular transmission is mounted pivotably on a pressure element in said closing unit.

* * * * *